US008881050B2

(12) United States Patent
Kim et al.

(10) Patent No.: US 8,881,050 B2
(45) Date of Patent: Nov. 4, 2014

(54) SCROLLING METHOD OF MOBILE TERMINAL AND APPARATUS FOR PERFORMING THE SAME

(75) Inventors: Mee Young Kim, Seoul (KR); Sung Sik Lee, Goyang-si (KR); Kyoung Sik Yoon, Seongnam-si (KR); Byoungju Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 479 days.

(21) Appl. No.: 12/834,983

(22) Filed: Jul. 13, 2010

(65) Prior Publication Data

US 2011/0010659 A1    Jan. 13, 2011

(30) Foreign Application Priority Data

Jul. 13, 2009    (KR) ........................ 10-2009-0063449

(51) Int. Cl.
*G06F 3/14* (2006.01)
*G06F 3/0485* (2013.01)
*G06F 3/0488* (2013.01)

(52) U.S. Cl.
CPC .......... *G06F 3/04883* (2013.01); *G06F 3/0485* (2013.01)
USPC ............................ 715/784; 345/173; 345/156

(58) Field of Classification Search
CPC ... G06F 3/0486; G06F 3/0482; G06F 3/0485; G06F 3/04855; G06F 3/04883; G06F 3/048; G06F 3/0481; G06F 3/04817
USPC ................................... 715/784; 345/173, 156
See application file for complete search history.

(56) References Cited

U.S. PATENT DOCUMENTS

| | | | | | |
|---|---|---|---|---|---|
| 4,491,933 A | * | 1/1985 | Ursin et al. | ................... | 715/201 |
| 4,783,760 A | * | 11/1988 | Carosso | ........................ | 715/210 |
| 5,317,306 A | * | 5/1994 | Abraham et al. | ............. | 345/684 |
| 5,528,259 A | * | 6/1996 | Bates et al. | ................... | 345/676 |
| 5,548,702 A | * | 8/1996 | Li et al. | .......................... | 715/769 |
| 5,553,223 A | * | 9/1996 | Greenlee et al. | .............. | 715/866 |

(Continued)

FOREIGN PATENT DOCUMENTS

| | | |
|---|---|---|
| CN | 1802853 A | 7/2006 |
| CN | 101027629 A | 8/2007 |

(Continued)

OTHER PUBLICATIONS

Exactly How to Create a Custom jQuery Accordion—Tuts+ Code Tutorial.*

(Continued)

*Primary Examiner* — Steven Sax
*Assistant Examiner* — David Choi
(74) *Attorney, Agent, or Firm* — Cha & Reiter, LLC.

(57) ABSTRACT

A scrolling method and apparatus devices having display screens such as a mobile terminal. When a first image on a screen cannot be moved in a direction by a touch input, a region of the first image is modified in response to the touch input and the modified image is subsequently restored to the first image after the touch is released or a preset amount of time passes. The modification of the region of the image provides an indication that is fed back to the user so that the end or last part of the image is displayed and cannot be moved further, so that undesired repetitive touch input can be prevented.

24 Claims, 13 Drawing Sheets

(56) References Cited

U.S. PATENT DOCUMENTS

| | | | |
|---|---|---|---|
| 5,621,906 A * | 4/1997 | O'Neill et al. | 715/848 |
| 5,677,708 A * | 10/1997 | Matthews et al. | 348/E5.104 |
| 5,740,389 A * | 4/1998 | Li et al. | 715/769 |
| 5,872,566 A * | 2/1999 | Bates et al. | 715/786 |
| 5,877,760 A * | 3/1999 | Onda et al. | 715/784 |
| 5,923,328 A * | 7/1999 | Griesmer | 715/854 |
| 5,943,051 A * | 8/1999 | Onda et al. | 715/786 |
| 5,953,005 A * | 9/1999 | Liu | 715/243 |
| 5,978,818 A * | 11/1999 | Lin | 715/209 |
| 6,061,063 A * | 5/2000 | Wagner et al. | 715/784 |
| 6,128,012 A * | 10/2000 | Seidensticker et al. | 345/685 |
| 6,147,670 A * | 11/2000 | Rossmann | 345/685 |
| 6,204,837 B1 * | 3/2001 | Smith | 345/157 |
| 6,209,009 B1 * | 3/2001 | Schwartz et al. | 715/201 |
| 6,278,455 B1 * | 8/2001 | Baker | 715/716 |
| 6,288,718 B1 * | 9/2001 | Laursen et al. | 715/800 |
| 6,300,967 B1 * | 10/2001 | Wagner et al. | 715/784 |
| 6,369,837 B1 * | 4/2002 | Schirmer | 715/764 |
| 6,532,001 B1 * | 3/2003 | Taraki et al. | 345/163 |
| 6,690,387 B2 * | 2/2004 | Zimmerman et al. | 345/684 |
| 6,952,220 B1 * | 10/2005 | Rossmann | 345/684 |
| 7,009,599 B2 * | 3/2006 | Pihlaja | 345/173 |
| 7,137,135 B2 * | 11/2006 | Schein et al. | 725/40 |
| 7,184,064 B2 * | 2/2007 | Zimmerman et al. | 345/684 |
| 7,447,987 B2 * | 11/2008 | Sauermann | 715/212 |
| 7,456,823 B2 * | 11/2008 | Poupyrev et al. | 345/173 |
| 7,458,035 B2 * | 11/2008 | Lindemann | 715/784 |
| 7,469,381 B2 * | 12/2008 | Ording | 715/702 |
| 7,479,947 B2 * | 1/2009 | Pihlaja | 345/173 |
| 7,515,142 B2 * | 4/2009 | Park | 345/173 |
| 7,546,548 B2 * | 6/2009 | Chew et al. | 715/810 |
| 7,564,467 B2 * | 7/2009 | Haneda et al. | 345/619 |
| 7,577,917 B2 * | 8/2009 | Vong | 715/767 |
| 7,607,111 B2 * | 10/2009 | Vaananen et al. | 715/864 |
| 7,692,637 B2 * | 4/2010 | Davis | 345/173 |
| 7,761,806 B2 * | 7/2010 | Kim | 715/784 |
| 7,786,975 B2 * | 8/2010 | Ording et al. | 345/156 |
| 7,907,974 B2 * | 3/2011 | Brinda et al. | 455/566 |
| 8,122,379 B2 * | 2/2012 | Sakuyama et al. | 715/838 |
| 8,365,091 B2 * | 1/2013 | Young et al. | 715/784 |
| 2002/0175896 A1 * | 11/2002 | Vaananen et al. | 345/158 |
| 2004/0001105 A1 * | 1/2004 | Chew et al. | 345/817 |
| 2004/0008191 A1 * | 1/2004 | Poupyrev et al. | 345/184 |
| 2006/0017711 A1 * | 1/2006 | Pihlaja | 345/173 |
| 2006/0053367 A1 * | 3/2006 | Chen et al. | 715/513 |
| 2006/0129951 A1 * | 6/2006 | Vaananen et al. | 715/864 |
| 2007/0067328 A1 | 3/2007 | Mingot et al. | |
| 2007/0146337 A1 | 6/2007 | Ording et al. | |
| 2007/0266411 A1 * | 11/2007 | Yamamoto et al. | 725/88 |
| 2008/0066003 A1 * | 3/2008 | Vong | 715/763 |
| 2008/0129685 A1 | 6/2008 | Bertolus et al. | |
| 2008/0168384 A1 * | 7/2008 | Platzer et al. | 715/784 |
| 2008/0168386 A1 * | 7/2008 | Brinda et al. | 715/786 |
| 2008/0168404 A1 | 7/2008 | Ording | |
| 2008/0168478 A1 * | 7/2008 | Platzer et al. | 719/328 |
| 2008/0184171 A1 * | 7/2008 | Sato et al. | 715/841 |
| 2008/0252662 A1 * | 10/2008 | Hyatt | 345/660 |
| 2008/0295014 A1 * | 11/2008 | Hennum et al. | 715/771 |
| 2008/0313574 A1 * | 12/2008 | Aravamudan et al. | 715/854 |
| 2009/0049395 A1 * | 2/2009 | Lee et al. | 715/765 |
| 2009/0070711 A1 * | 3/2009 | Kwak et al. | 715/829 |
| 2009/0119585 A1 * | 5/2009 | Sakuyama et al. | 715/273 |
| 2009/0210791 A1 * | 8/2009 | Proehl et al. | 715/720 |
| 2009/0210792 A1 * | 8/2009 | Proehl et al. | 715/720 |
| 2009/0228825 A1 * | 9/2009 | Van Os et al. | 715/780 |
| 2009/0254853 A1 * | 10/2009 | Jacob | 715/800 |
| 2010/0020102 A1 * | 1/2010 | Vaananen et al. | 345/659 |
| 2010/0125818 A1 * | 5/2010 | Vaananen et al. | 715/864 |
| 2010/0153891 A1 * | 6/2010 | Vaananen et al. | 715/864 |
| 2010/0162306 A1 * | 6/2010 | Craner | 725/39 |
| 2010/0175027 A1 * | 7/2010 | Young et al. | 715/830 |
| 2010/0205529 A1 * | 8/2010 | Butin et al. | 715/704 |
| 2010/0205530 A1 * | 8/2010 | Butin et al. | 715/715 |
| 2010/0283743 A1 * | 11/2010 | Coddington | 345/173 |
| 2010/0315439 A1 * | 12/2010 | Huang et al. | 345/661 |
| 2011/0010659 A1 * | 1/2011 | Kim et al. | 715/784 |
| 2011/0069017 A1 * | 3/2011 | Victor | 345/173 |
| 2011/0090255 A1 * | 4/2011 | Wilson et al. | 345/647 |
| 2011/0107264 A1 * | 5/2011 | Akella | 715/830 |
| 2011/0202859 A1 * | 8/2011 | Fong | 715/769 |
| 2012/0272181 A1 * | 10/2012 | Rogers et al. | 715/784 |

FOREIGN PATENT DOCUMENTS

| | | | |
|---|---|---|---|
| CN | 101384047 A | 3/2009 | |
| EP | 2 034 399 A2 | 3/2009 | |
| KR | 2008-0068490 | 7/2008 | H04B 1/40 |
| KR | 2009-0032558 | 4/2009 | H04B 1/40 |
| KR | 2009-0073084 | 7/2009 | G06F 3/048 |

OTHER PUBLICATIONS

The CSS-Only Accordion Effect.*
The Definitive In-Depth Review_Optus HTC Dream with Google Android.*

* cited by examiner

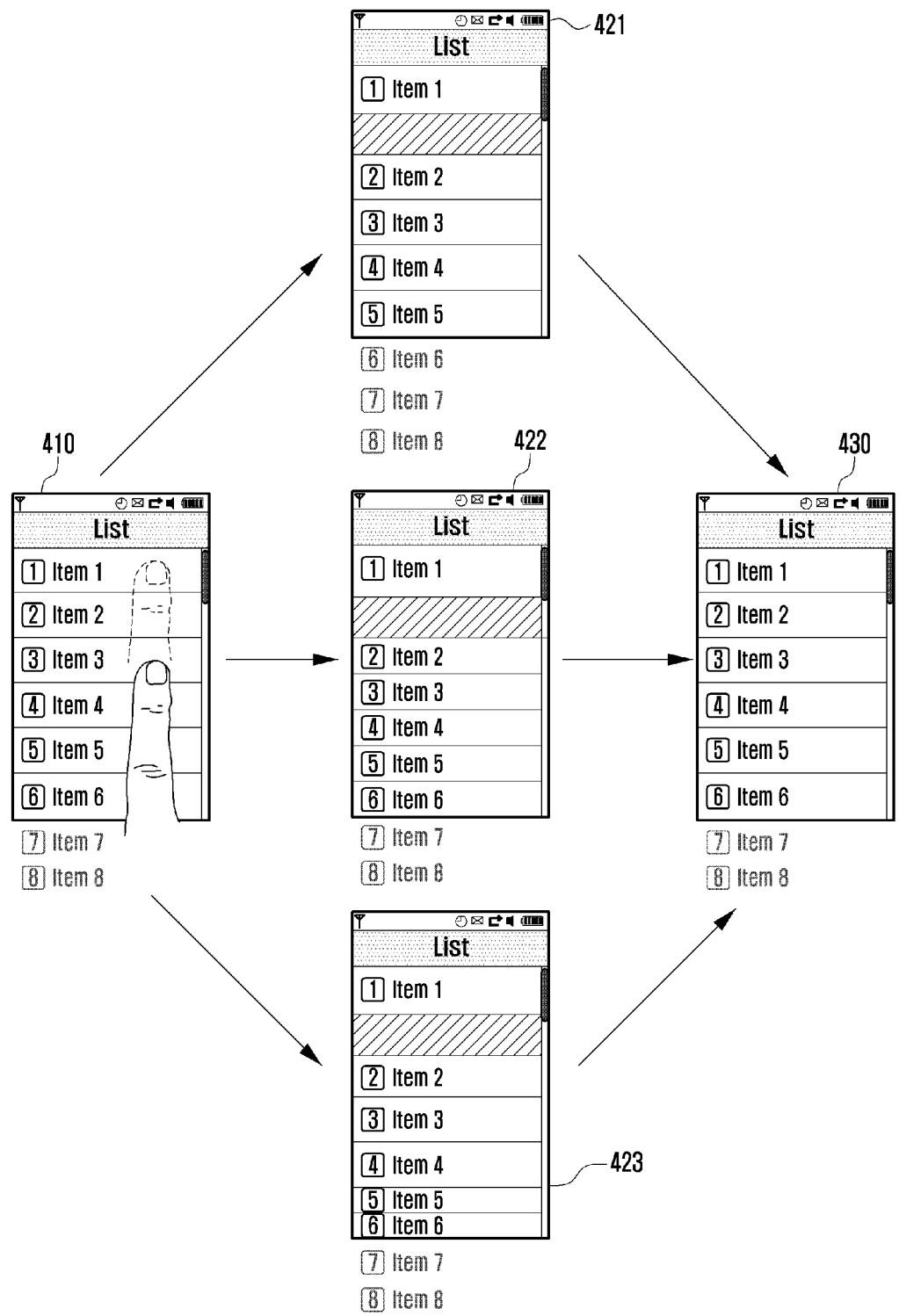

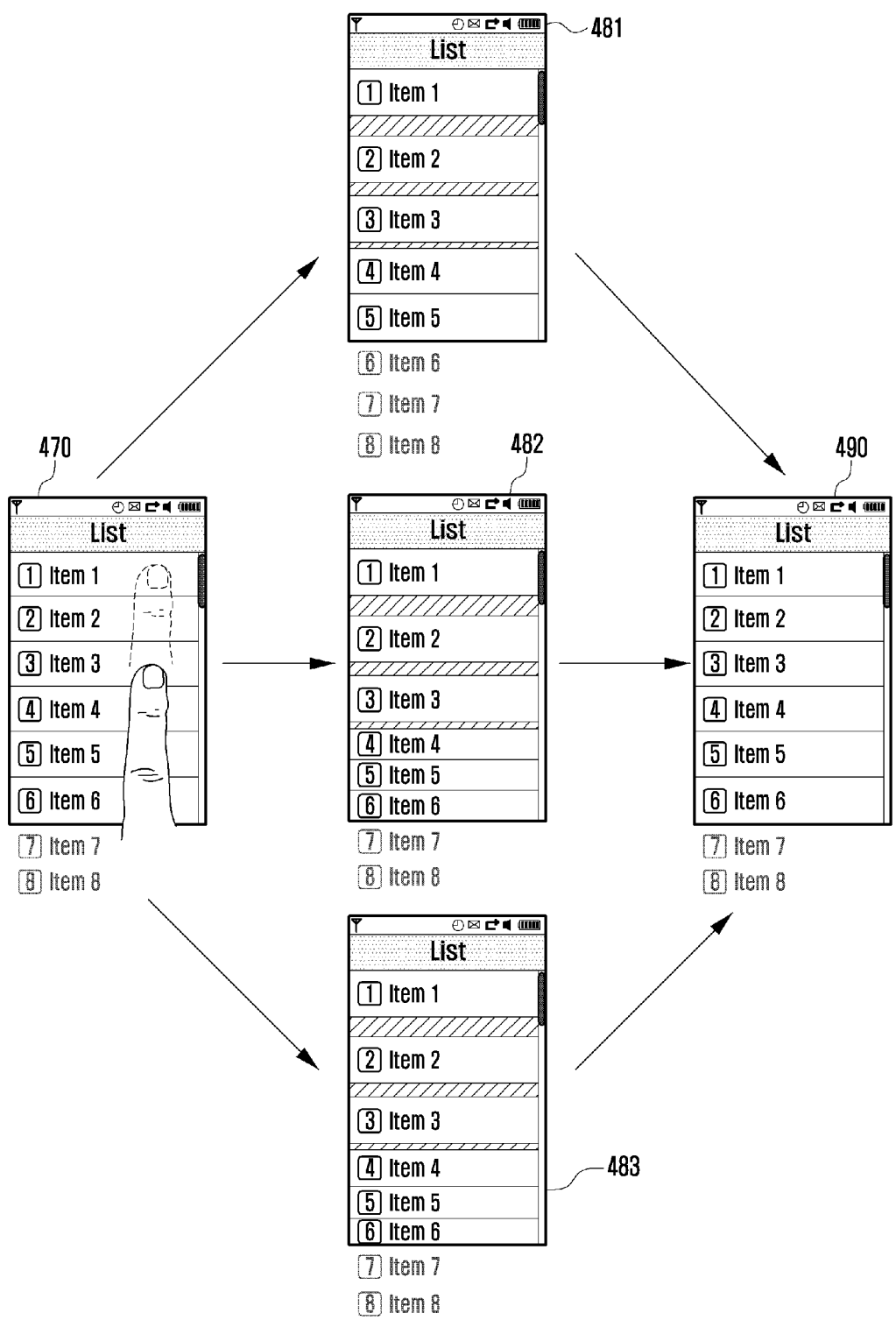

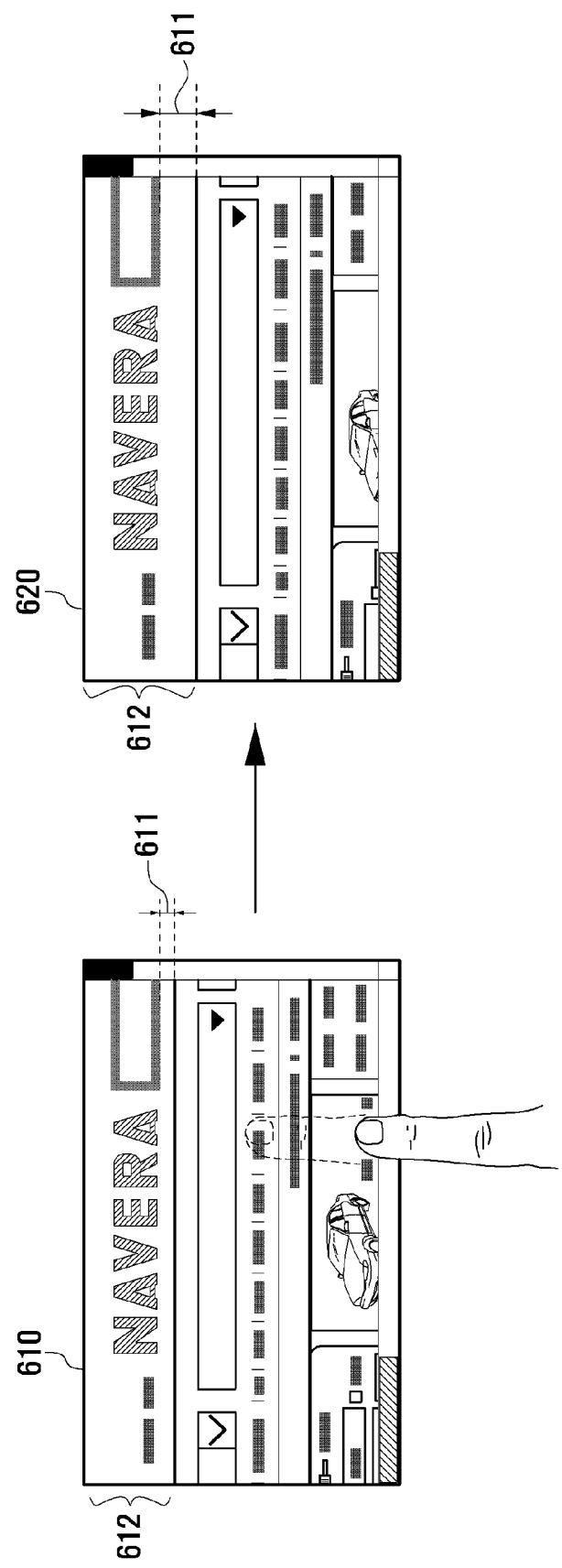

US 8,881,050 B2

SCROLLING METHOD OF MOBILE TERMINAL AND APPARATUS FOR PERFORMING THE SAME

CLAIM OF PRIORITY

This application claims the benefit of priority under 35 U.S.C. §119 from Korean Patent Application No. 10-2009-0063449, filed on Jul. 13, 2009, the entire contents of which are incorporated herein by reference in its entirety.

BACKGROUND OF THE INVENTION

1. Field of the Invention

The present invention relates generally to a scrolling method of a mobile terminal and an apparatus for performing the same. More particularly, the present invention relates to a scrolling method of a mobile terminal for scrolling image to be output and an apparatus for performing the same.

2. Description of the Related Art

A touch screen is an input and display device performing an input function and an output (display) function. An electronic device employing the touch screen does not need an additional discrete input device, so that a slimmer and smaller electronic device can be achieved. The touch screen enables an intuitive manipulation because of performing an input function only by being touched with a finger, a stylus pen, or the like. For this reason, electronic devices using the touch screen are increasing recently.

Mobile terminals have already become a necessity of life to modern people owing to the many advantages being portable, particularly as more recent mobile terminals provides various functions in addition to voice, such as video call, inputting/outputting information, music, games, commerce, Internet access, and storing data.

Due to the various functions of the mobile terminal, recently a user interface (hereinafter, referred to "UI") has been developed for a user to access most of the functions of the mobile terminal through a touch screen easy and conveniently. For example, the mobile terminal may permit scrolling of an image corresponding to a touch input occurring on the touch screen, such as a drag, flick, a sweep, and the like.

However, the conventional mobile terminals do not scroll an image when a touch input occurs in a state where the last region of the image is output in the scrolling direction and the image cannot be scrolled any further, and does not indicate to the user that the last region has been reached with regard to scrolling. In this case, the user may determine the mobile terminal does not detect the touch input and may repeat the touch input. In other words, since the conventional mobile terminal does not inform the user that the last region of the image is output and the image cannot be further scrolled, the user feels inconvenienced and uncomfortable utilizing repetitive touch inputs until he/she realizes the last region has been reached.

SUMMARY OF THE INVENTION

The present invention provides a scrolling method of a mobile terminal for visually indicating that the last region of an image has been output to a user, and an apparatus for performing the same.

In accordance with an exemplary aspect of the present invention, there is provided a scrolling method of a mobile terminal that preferably includes: providing a touch input for moving an original image along a display screen in a direction corresponding to a direction of a user's touch; modifying a display of at least some of a region of a first image portion of the original image in response to sensing a touch input when the first image portion output on the display screen cannot be moved in the direction corresponding to the direction of the user's touch; and restoring the original image on the display in its entirety.

In accordance with another exemplary aspect of the present invention, there is provided a scrolling apparatus of a mobile terminal that preferably includes: a display unit for outputting an original image; a touch panel recognizing a touch input for moving the image on the display unit in a particular direction; and a control unit modifying at least some region of a first image portion of the original image and restoring the modified region to the first image portion in response to the touch input when the first image portion output on the display unit cannot be moved in the particular direction corresponding to movement of a user.

BRIEF DESCRIPTION OF THE DRAWINGS

The above and other exemplary aspects, features and advantages of certain exemplary embodiments of the present invention will become more apparent to a person of ordinary skill in the art from the following description taken in conjunction with the accompanying drawings, in which:

FIGS. 4A, 4B and 4C are views illustrating exemplary screens provided to illustrate a scrolling method according to still another exemplary embodiment of the present invention;

FIG. 6 is a view illustrating exemplary screens provided to describe the scrolling method of a mobile terminal according to the exemplary embodiment of the present invention performed when a web page is output.

DETAILED DESCRIPTION

Figure 1:
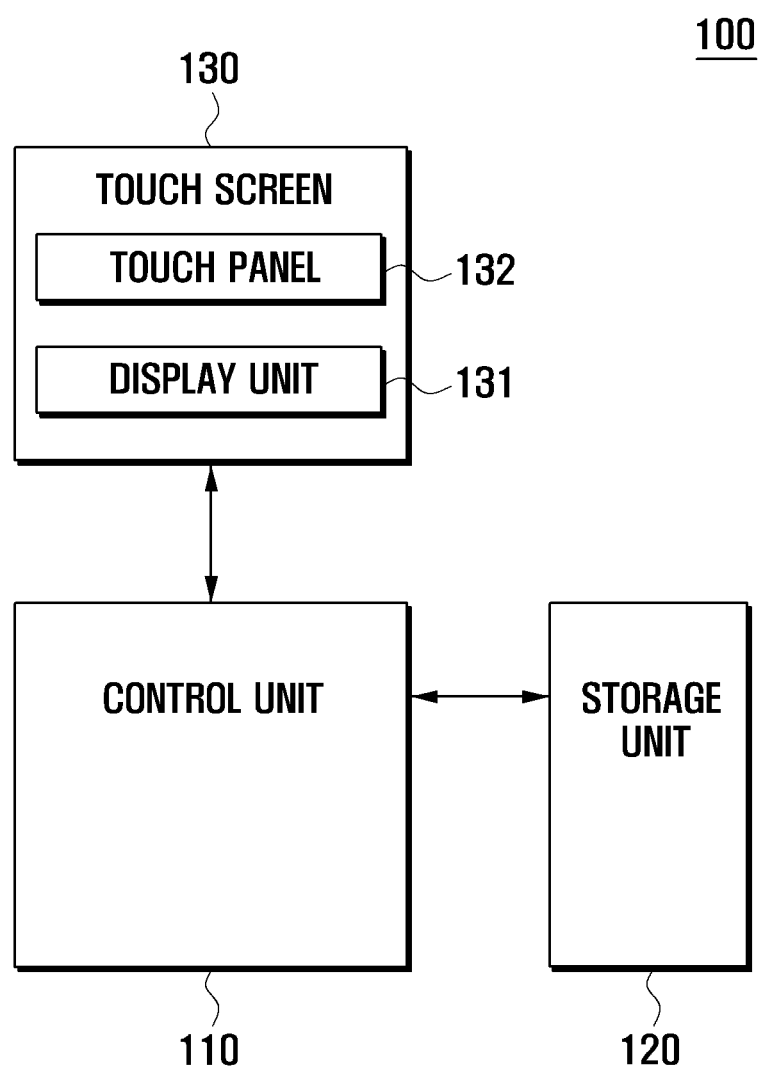
FIG. 1 is a block diagram schematically illustrating a mobile terminal according to an exemplary embodiment of the present invention.

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring appreciation of the subject matter of the present invention by a person of ordinary skill in the art.

Accordingly, the meaning of specific terms or words used in the specification and the claims should not be limited to the literal or commonly employed sense, but should be construed in accordance with the spirit of the invention as understood by a person of ordinary skill in the art. The description of the various exemplary embodiments is to be construed as exemplary only and does not describe every possible instance of the presently claimed invention. Therefore, it should be understood that various changes may be made and equivalents may be substituted for elements of the claimed invention that within the spirit and scope of same.

The mobile terminal of the present invention may comprise any information and communication appliance or multimedia appliance, such as, for example, a navigation device, a digital broadcast receiving terminal, a personal digital assistant (PDA), a smart phone, a portable multimedia player (PMP), an international mobile telecommunications 2000 (IMT 2000) terminal, a code division multiple access (CDMA) terminal, a wideband code division multiple access (WCDMA) terminal, a global system for mobile communication (GSM) terminal, a universal mobile telecommunication service (UMTS) terminal, a laptop computer, or ultra mobile personal computer (UMPC).

The term "to scroll" means to move an image relative to a display screen in which the image is displayed on a display unit in response to a touch input by a user, such as up, down, left, and right, etc. The "touch input" includes a first touch input where acceleration of a touch point when a touch is released is less than a preset threshold and a second touch input where the acceleration of the touch point when the touch is released is higher than the preset threshold. In general, the first touch input is referred to by a person of ordinary skill in the art as a "drag" and the second touch input is referred to by a person of ordinary skill in the art as a "flick" or "sweep". The terms "drag," "flick," and "sweep" may also be referred to as other terms by a user.

In the present invention, in a case where a first image portion output on a screen cannot be moved in a desired direction when an image is selected for movement in the desired direction by a touch input, at least some region of the first image portion is modified in response to the touch input and the image in which the at least some region is modified is restored into the first image. The first image portion refers to some of the image that is output on the display screen and includes the last region of the original image. Furthermore, in the present invention, at least some region of the first image portion is modified while fixing at least some of edges of the original image such that a region beyond edges of the original image is not output.

The exemplary embodiments of the present invention are provided with reference to an exemplary configuration of a mobile terminal and drawings illustrating exemplary screens thereof.

FIG. 1 is a block diagram schematically illustrating a mobile terminal 100 according to an exemplary embodiment of the present invention.

Referring now to FIG. 1, the mobile terminal 100 according to the exemplary embodiment of the present invention may preferably include a touch screen 130, a storage unit 120, and a control unit 110.

The storage unit 120 may store a program used for performing an overall operation and specific functions of the mobile terminal 100 and data generated during the performance of the program. For example, the storage unit 120 may store an operating system (OS) for booting the mobile terminal 100 and a data generated when an application program for operating the mobile terminal 100 is used. The storage unit 120 may preferably comprise a read only memory (ROM) and/or a random access memory (RAM). The storage unit 120 may store call logs in which sent and received call logs, missed call logs and the like are stored. Music files may also be stored in the storage unit 120.

According to an exemplary aspect of the present invention, when the last scrollable region of an image is reached during the scrolling of the image or a touch input is generated in a direction where the image is unscrollable (hereinafter, referred to a "unscrollable direction"), at the state where the last region is output, the storage unit 120 may store a program used for modifying at least some portion of the first image and restoring the modified portion of the image in response to the touch input. Moreover, the application may be used to inform a user with an indication (visual, audible, or both) that the desired movement of the first image output on a screen cannot be displayed.

Still referring to FIG. 1, the touch screen 130 may preferably include a display unit 131 and a touch panel 132. The display unit 131 may output status information generated during the operation of the mobile terminal 100 such as image data, key manipulation and function setting of the user. The display unit 131 may display signals and color information output from the control unit 110 to visibly distinguish status information. The display unit 131 may include a liquid crystal display (LCD), an organic light emitting diode (OLED), or any type of thin-film screen technology and the like. The display unit 131 may output a scrollable image. The image may include item images (for example, call logs, items of music files) of a plurality of items arranged in the vertical direction, icon images (for example, menu icon output images, thumbnail output images of photographs and moving pictures) of a plurality of items arranged in the form of small icons in the vertical and horizontal directions, and an image of resolution higher than that of the display unit 131 such as a webpage, and a high resolution photograph image. The display unit 131, in order to provide feed back to the user (i.e. indicate) via the control unit 110 that the scrolling of an image is impossible, may fix some edges of the first image portion output on the screen, modify at least some region of the first image portion, and restores the modified image region into the first image portion to output the image.

With continued reference to FIG. 1, the touch panel 132 may serve as an input device receiving the touch input by the user. The touch input, as described above, may include the first touch input in which acceleration of a touch point when a touch is released is lower than the preset threshold and the second touch input in which the acceleration of the touch point when the touch is released is higher than the preset threshold. In this exemplary embodiment of the present invention, the first touch input is referred to as "drag" and the second touch input is referred to "flick" and/or "sweep." However, the first touch input and the second touch input are not limited to drag, flick, and sweep. In other words, the first touch input and the second touch input may be called various names by the user. The touch panel 132 may be mounted on the whole surface of the display unit 131, and may detect change of physical amount generated by the touch of the user, convert the change of physical amount caused by the touch into a touch signal, and transmit the touch signal to the control unit 110. The touch panel 132 may comprises one of a pressure type touch panel using a pressure sensor, a resistive touch panel, capacitive touch panel, a surface acoustic wave touch panel, an infrared touch panel, and an inductive touch panel. Since principles of operating the touch panels 132 are already known to those skilled in the art, their descriptions will be omitted herein.

The control unit 110 can perform an overall control function of the mobile terminal 100 and may control signal flow among blocks. The control unit 110 may also control the touch screen 130 to display information and to receive a touch signal to perform a function assigned to the touch signal. For example, when a user touches a specific music file in the music file items, the control unit 110 may control the touched music file to be played.

The control unit 110 can recognize the touch input by the user into flick, drag, and sweep by analyzing the touch signal transmitted from the touch panel 131. When a touch input occurs, the control unit 110 may check a scroll direction of an image corresponding to the touch input and may control the image to be scrolled in the scroll direction. In this case, the image may have a resolution higher than that of the display unit 131. Especially, when a first image output of a screen cannot be moved in the scroll direction indicated by a user, the control unit 110 can modify at least some region of the first image portion in response to the touch input and may restore the modified image into the original image. According to the graphical effect, visual notification that the last region of the image is output may be fed back to the user this way. The last region may vary according to the scroll direction.

For example, at a scrolling-down where an input tool such as a finger, a stylus pen, etc., is moved down after the touch, the last region may be a first one of a plurality of items. At a scrolling-up where the input tool moves up, the last region may be the last one of the items. When the first image is an image such as call logs, music file items, etc. (where the items are arranged in a column), the last region of the first image to be modified to be at least one of displaying regions of items and at least one of gaps between the display regions of items. When the first image comprises thumbnail items of photographs, menu icon items, etc., (where the items are arranged in multiple rows and columns), the at least some region of the first image portion to be modified to be at least one of gaps between the rows and between the columns. The last region of the first image portion to be modified may be a size of the icons contained in the columns and rows. When the first image portion is a webpage including at least one template, the last region of the first image portion to be modified may be at least one template region, at least one gap between the templates, and at least one margin between an edge of the webpage and the templates.

Although not illustrated in the drawings, the mobile terminal 100 may further include many elements having additional functions, such as a camera module shooting an image or a moving picture, a near communication module for near wireless communication, a broadcasting receiver module receiving broadcasting, a digital sound reproduction module such as an MP3 player module, and an internet communication module communicating with Internet to perform internet function, just to name a few non-limiting examples. Although the elements are very various to keep pace with convergence trend of digital devices as impossible as to item, the mobile terminal 100 may further include elements equivalent to the described elements.

Hereinafter, a scrolling method of a mobile terminal according to an exemplary embodiment of the present invention will be described with reference to drawings illustrating exemplary screens.

Figure 2A:
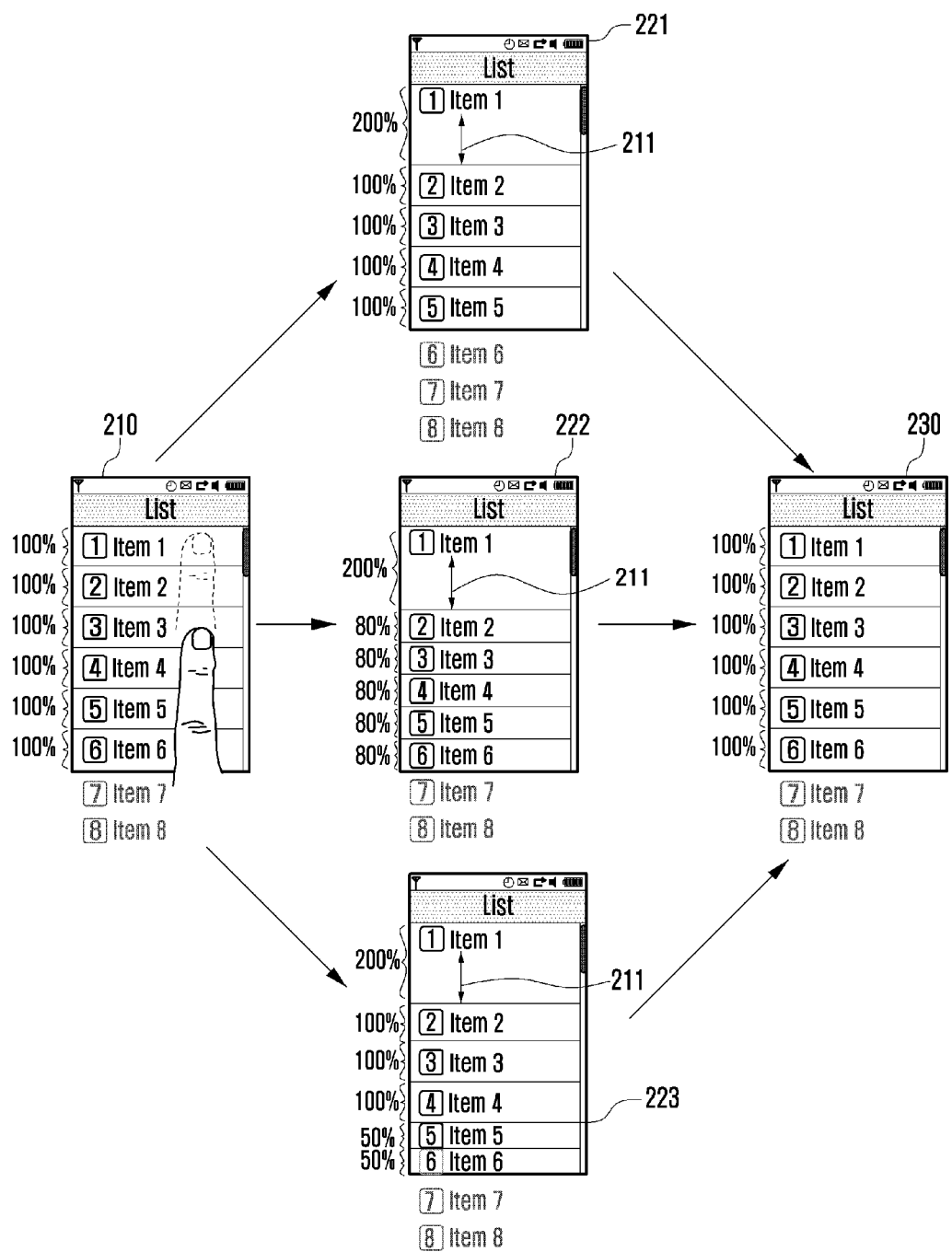
FIGS. 2A and 2B are views illustrating exemplary screens provided to illustrate a scrolling method of a mobile terminal according to an exemplary embodiment of the present invention.
Figure 2B:
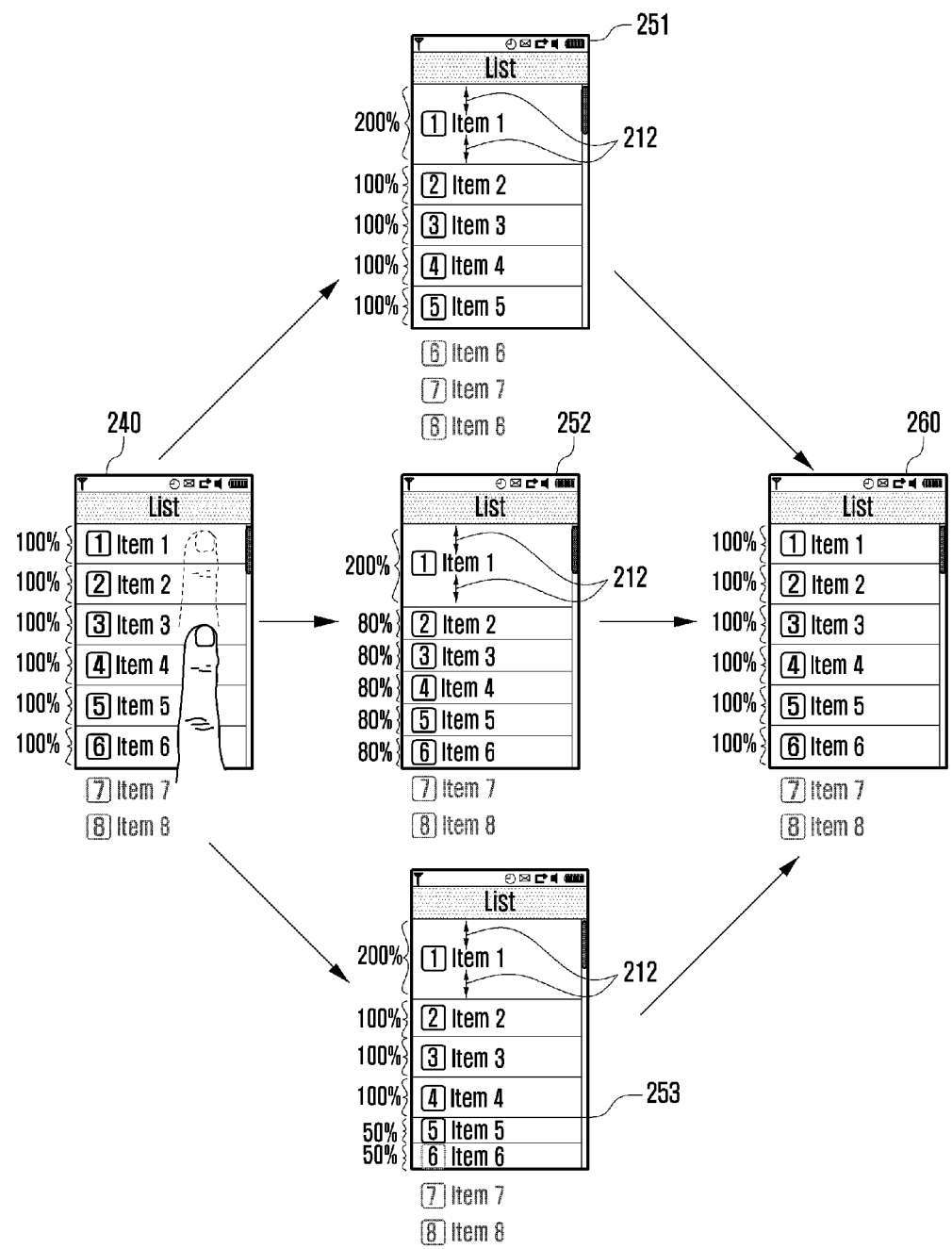

FIGS. 2A and 2B are views illustrating exemplary screens provided show a scrolling method of a mobile terminal according to the exemplary embodiment of the present invention.

Referring to FIGS. 1 to 2B, the display unit 131 may arrange the plurality of items in the vertical direction, i.e. output the items arranged in a column (hereinafter, referred to as item images). The item images may an image outputting a call log, a music file item, etc. The display unit 131 may output only some of the items when all of the plurality of items cannot be output on a screen at the same time. The items can be distinguished by rectangular regions of a preset size (hereinafter, referred to as a "displaying region of an item") to output. For example, the display unit 131 may output a first item ITEM 1 to a sixth item ITEM 6 on a screen 210 under the control of the control unit 110 as illustrated in the drawings. After that, when a scrolling-up signal is input, the display unit 131 may sequentially push the first item ITEM 1 upward from the first item ITEM 1 and sequentially outputs the remaining items in the screen 210, such as a seventh item ITEM 7 and an eighth item ITEM 8 for the scroll of the item images.

However, since the first item ITEM 1 is the first item when a scrolling-down signal is input, the display unit 131 may increase a size of the displaying region of the first item such as a longitudinal length of the displaying region of the first item and output the increased the displaying region of the first item in order to notify the first item ITEM 1 is the last item to the user. When the longitudinal length of the displaying region of the first item is increased in response to the first touch input, the longitudinal length of the displaying region of the first item may be increased until, for example, when the first touch input is released. When the first touch input is generated in the opposite direction without release of the touch input, the increased longitudinal length of the displaying region of the first item may be reduced to the original longitudinal length in response to the first touch input occurring in the opposite direction. Alternatively, when the longitudinal length of the displaying region of the first item is increased according to a second touch input such as flick or sweep, the longitudinal length of the displaying region of the first item may be increased to a preset length for a preset time, and then restored to the original length after the preset time expires. As described, when the longitudinal length of the displaying region of the first item according to the touch input is increased, the display unit 131 may fix text and numbers (hereinafter, referred to as an "item name") contained in the displaying region of the first item to an original position and may scroll the remaining items as much as the expanded size while keeping displaying regions of the remaining items ITEM 2 to ITEM 6.

For example, as shown in FIG. 2A, the display unit 131, as illustrated in a screen 221, may increase the longitudinal length of the displaying region of the first item twice (200%) the original length thereof and may shift the second item to the fifth item to positions of the third item to the sixth item on the screen 210, while keeping the uppermost edge of the displaying region and the name of the first item. In this case, the sixth item is not displayed on the display unit 131 on screen 221.

In the above description, the longitudinal length of the displaying region of the first item is increased twice (200%) the original length but the increased longitudinal length of the displaying region of the first item may vary according to a second touch input speed. For example, the faster the second touch input speed, the larger the increase in the longitudinal length of the displaying region of the first item.

In an alternative operation, the display unit 131 may reduce longitudinal lengths of the second item to the sixth item in order to keep the same amount of information (for example, the same number of items) outputting on a single screen. As illustrated in a screen 222, the display unit 131 may increase the longitudinal length of the displaying region of the first item twice the original length and may reduce the longitudinal lengths of the displaying regions of the second item to the sixth item to 80% of the original lengths. The display unit 131, as illustrated in a screen 222 in FIG. 2A, may reduce the longitudinal lengths of the displaying regions of the second item to the sixth item irregularly in order to make all of them fit on the display.

For example, the display unit 131, as illustrated in a screen 223 of FIG. 2A, may increase the longitudinal length of the displaying region of the first item by 200% of the original length, and may maintain the longitudinal lengths of the second item to the fourth item, but may reduce the longitudinal lengths of the displaying regions of the fifth item and the sixth item by 50% of the original lengths, as shown.

Alternatively, the display unit 131 may maintain the longitudinal length of the displaying region of the second item and may reduce the longitudinal lengths of the third item to the sixth item to 90%, 80%, 70%, and 60% of the original longitudinal lengths, respectively. In this case, the control unit 110 may change the sizes of the items properly as the longitudinal lengths of the displaying regions of the items are increased or decreased. After that, the display unit 131 can restore the increased or reduced sizes of the displaying regions of the items to the original sizes. In more detail, when the displaying regions of the items are increased or reduced by the first touch input under the control of the control unit 110, the display unit 131 may restore the increased or reduced sizes of the displaying regions of the items to the original sizes at the release of the touch. Meanwhile, when the first touch input occurs in the opposite direction before the release of the touch, the display unit 131 may reduce the increased size of the displaying region of the item to the original size in response to the opposite directional first touch input. Alternatively, when an image is modified by the second touch input, the display unit 131 may restore the increased or reduced sizes of the displaying regions of the items to their original sizes after the lapse of a preset time.

FIG. 2A illustrates the position of the name of the first item is fixed to the original position when the longitudinal length of the displaying region of the first item is increased, however the present invention is not limited thereto. As shown in FIG. 2B, when the uppermost item is displayed like a screen 240 and a scrolling-down signal is input, the control unit 110, as illustrated in screens 251, 252, and 253 of FIG. 2B, may expand a gap between the name of the first item and the upper edge of the displaying region of the first item and a gap between the name of the first item and the lower edge of the displaying region of the first item such that the name of the first item is positioned at the vertical center of the displaying region of the first item.

Alternatively, the control unit 110 may expand only the gap between the name of the first item and the upper edge of the displaying region of the first item when the longitudinal length of the displaying region of the first item is increased. That is, the control unit 110 may expand at least one of the gaps between the name of the first item and the upper edge of the displaying region of the first item and between the name of the first item and the lower edge of the displaying region of the first item when the longitudinal length of the displaying region of the first item is increased. Then, as shown in FIG. 2B, the control unit 110 may restore the modified image to the original state thereof as shown by screen 260. First arrows 211 of the screens 221 to 223 in FIG. 2A and second arrows 212 of the screens 251 to 253 in FIG. 2B are employed to denote the positional difference of the item 1 shown in FIGS. 2A and 2B, but do not appear actually in the display unit 131 of the mobile terminal 100. Since other operations are identical to those in association with FIG. 2A, description in association with FIG. 2B will be omitted.

Although in FIGS. 2A and 2B, the scroll-down signal is input when the first item is output, that is, the scrolling-down is impossible, the present invention is not limited thereto. For example, the control unit 110 may check whether or not the first item is output on the display unit 131 during the scrolling-down and may stop the scrolling-down when the first item is output. Then, the control unit 110 may provide graphical effects as illustrated in FIGS. 2A and 2B to provide visual feedback of the output of the last item to the user. In other words, when the last region of the first image is output and the first image cannot be moved in a direction of the touch input, a graphical effect of modifying at least some region of the first image that is output on the screen and of restoring the modified image to the first image is provided so that an indication of the impossibility of additional movement of the image can be fed back to the user.

FIGS. 3A to 3D are views illustrating exemplary screens provided to describe a scrolling method of a mobile terminal according to another exemplary embodiment of the present invention.

Figure 3A:
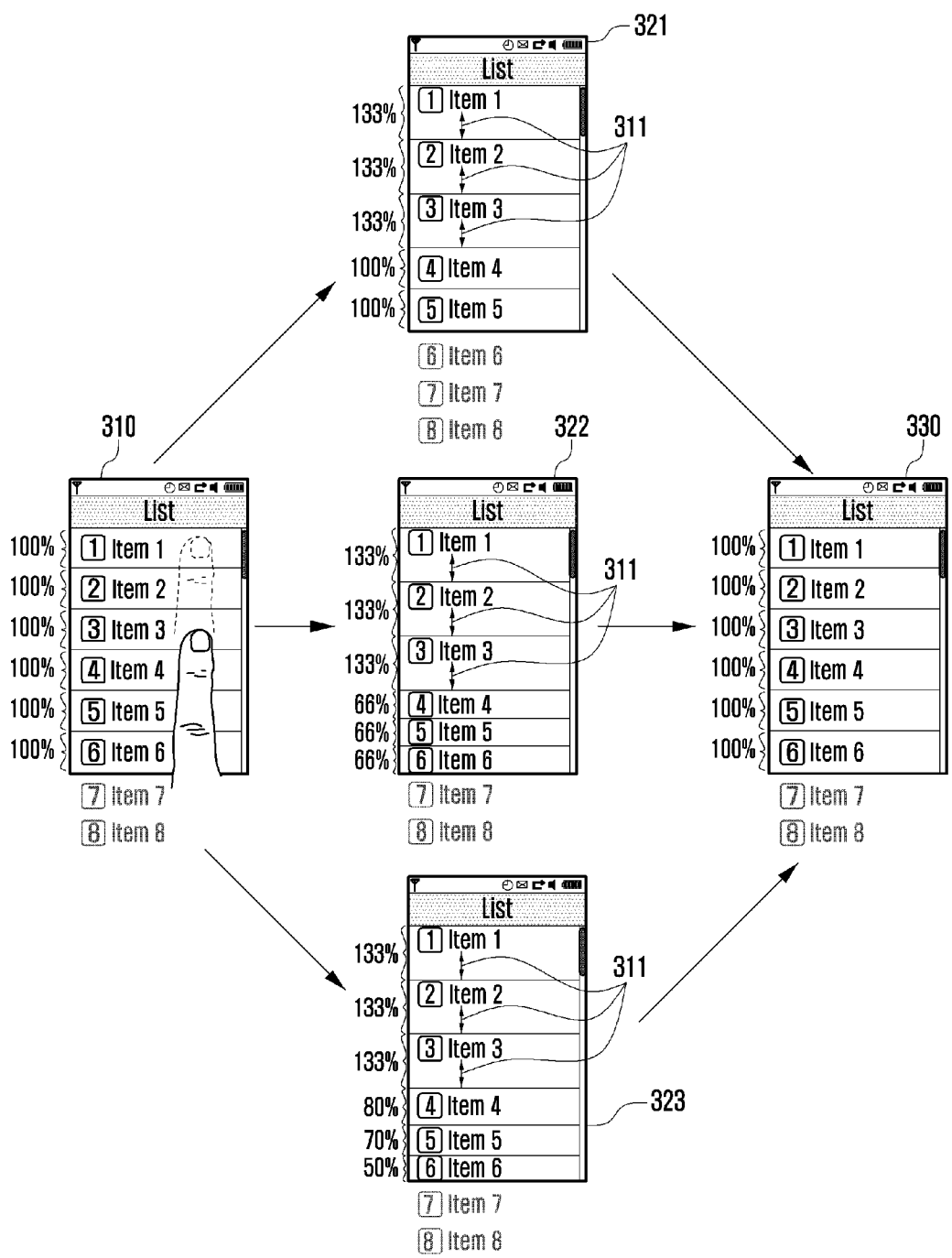
FIGS. 3A to 3D are views illustrating exemplary screens provided to illustrate a scrolling method of a mobile terminal according to another exemplary embodiment of the present invention.
Figure 3B:
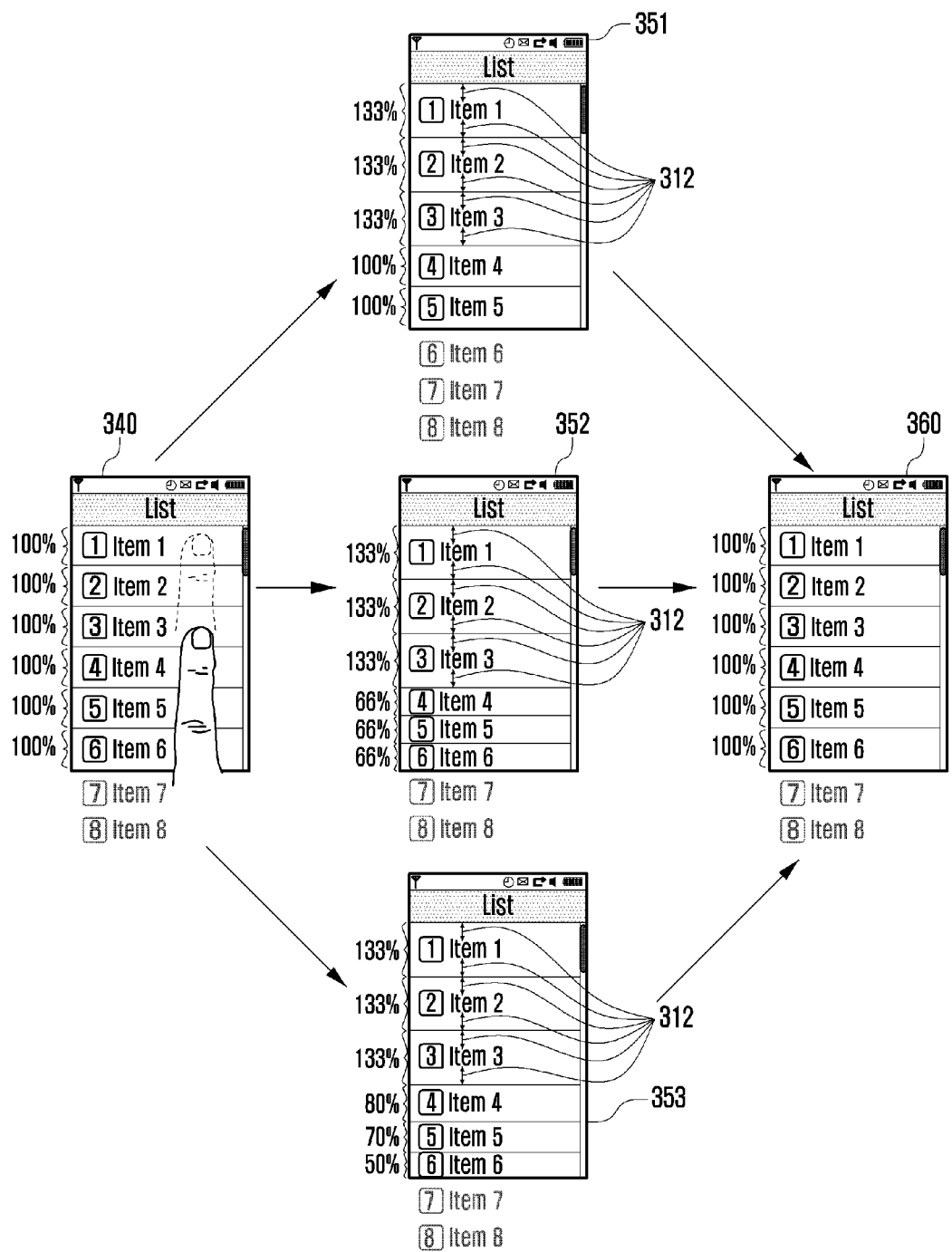

Referring now to FIGS. 1, 3A, and 3B, the display unit 131 may arrange a plurality of items in the vertical direction to output item images. The display unit 131 may display some of the items when such items cannot be simultaneously output on a screen due to size and resolution constraints. The items may be visually distinguished by rectangular displaying regions of preset sizes. The display unit 131 may output the first item ITEM 1 to the sixth item ITEM 6 such as screens 310 and 340 in respective FIGS. 3A and 3B. Then, when the scrolling-up signal is input, the display unit 131 may sequentially push the first item ITEM 1 upward from the first item ITEM 1 toward the very top of the display screen and may sequentially drag the remaining items in screens 310 and 340, such as a seventh item ITEM 7 and an eighth item ITEM 8 for the scroll of the item images. However, since the first item ITEM 1 is the first item when a scrolling-down signal is input, the display unit 131 may increase sizes of displaying regions for a plurality of preset items, for example, longitudinal lengths of displaying regions of three upper items such as longitudinal lengths of the displaying regions of the first item to the third item (shown in screens 321, 322, 323) uniformly to output the increased displaying regions of the items in order to notify the user that scrolling-down is not possible or permissible. In this case, the display unit 131 may output the names of the first item to the third items by fixing the names to the original positions (as illustrated in FIG. 3A), or at the vertical center of the displaying regions of the respective items (as illustrated in FIG. 3B). Third arrows 311 of the screens 321 to 323 of FIG. 3A and fourth arrows 312 of the screens 351 to 353 of FIG. 3B are employed to denote the difference between FIGS. 3A and 3B but do not appear actually in the display unit 131 of the mobile terminal 100.

Moreover, the display unit 131 may push together (i.e. crowd) the displaying regions of the fourth item to the sixth item as long as the increased lengths of the displaying regions of the first item to the third item while maintaining the longitudinal lengths of the displaying regions of the fourth item to the sixth item. Alternatively, the display unit 131 may reduce longitudinal lengths of the fourth item to the sixth item regularly or irregularly in order to keep the same number of the items being output on a screen.

For example, as illustrated in screens 321 and 351 of respective FIGS. 3A and 3B, the display unit 131 may increase the longitudinal lengths of the displaying regions of the first item to the third item by about 133% of the original lengths regularly and may output the displaying regions of the fourth item and the fifth item as they are shown at 100%. In this case, on screen 321 and 351, the sixth item is no longer output on the display unit 131. Alternatively, as illustrated in screens 322 and 352 in respective FIGS. 3A and 3B, the display unit 131 may increase the longitudinal lengths of the displaying regions of the first item to the third item to 133% of the original lengths, and may reduce the longitudinal lengths of the displaying regions of the fourth item to the sixth item to 66% of the original lengths regularly. Alternatively, the display unit 131, as illustrated in screens 323 and 353, may increase the longitudinal lengths of the displaying regions of the first item to the third item by about 133% of the original lengths, and may reduce the longitudinal length of the displaying region of the fourth item to about 80% of the original length, the longitudinal length of the displaying region of the fifth item to about 70% of the original length, and the longitudinal length of the displaying region of the sixth item to about 50% of the original length, irregularly. In this case, the control unit 110 may change the sizes of the names of the items properly as the longitudinal lengths of the displaying regions of the items are increased or decreased.

As shown in screens 330 and 360 of respective FIGS. 3A and 3B, the display unit 131 may restore the increased or reduced sizes of the displaying regions of the items to their original sizes (i.e. their original size considered to be 100%). As described herein above, when an image is modified by the first touch input, the display unit 131 may restore the modified image to the original image at the release of the touch. When the image is modified by the second touch input, the display unit 131 may restore the modified image after the lapse of a preset time period.

Figure 3C:
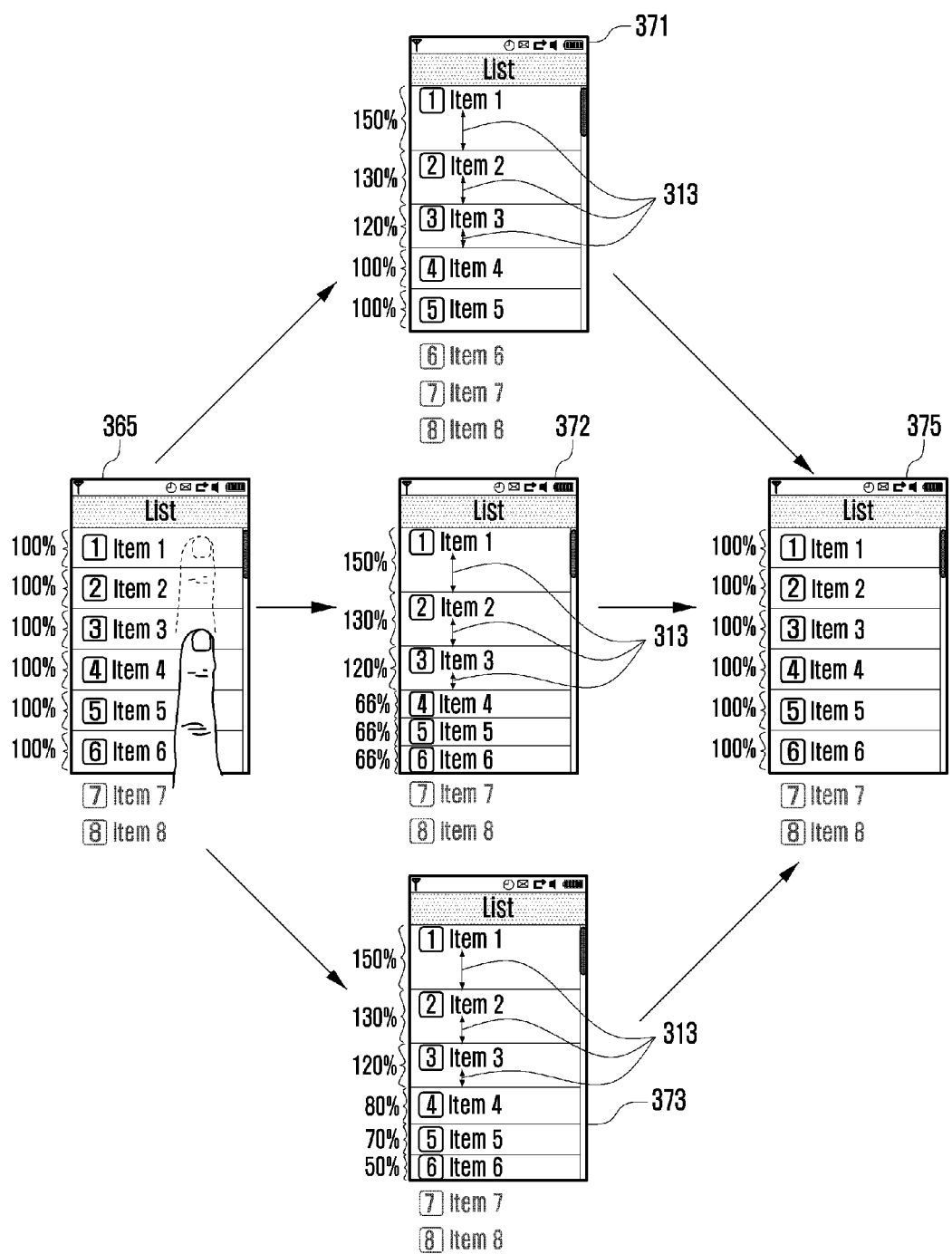
Figure 3D:
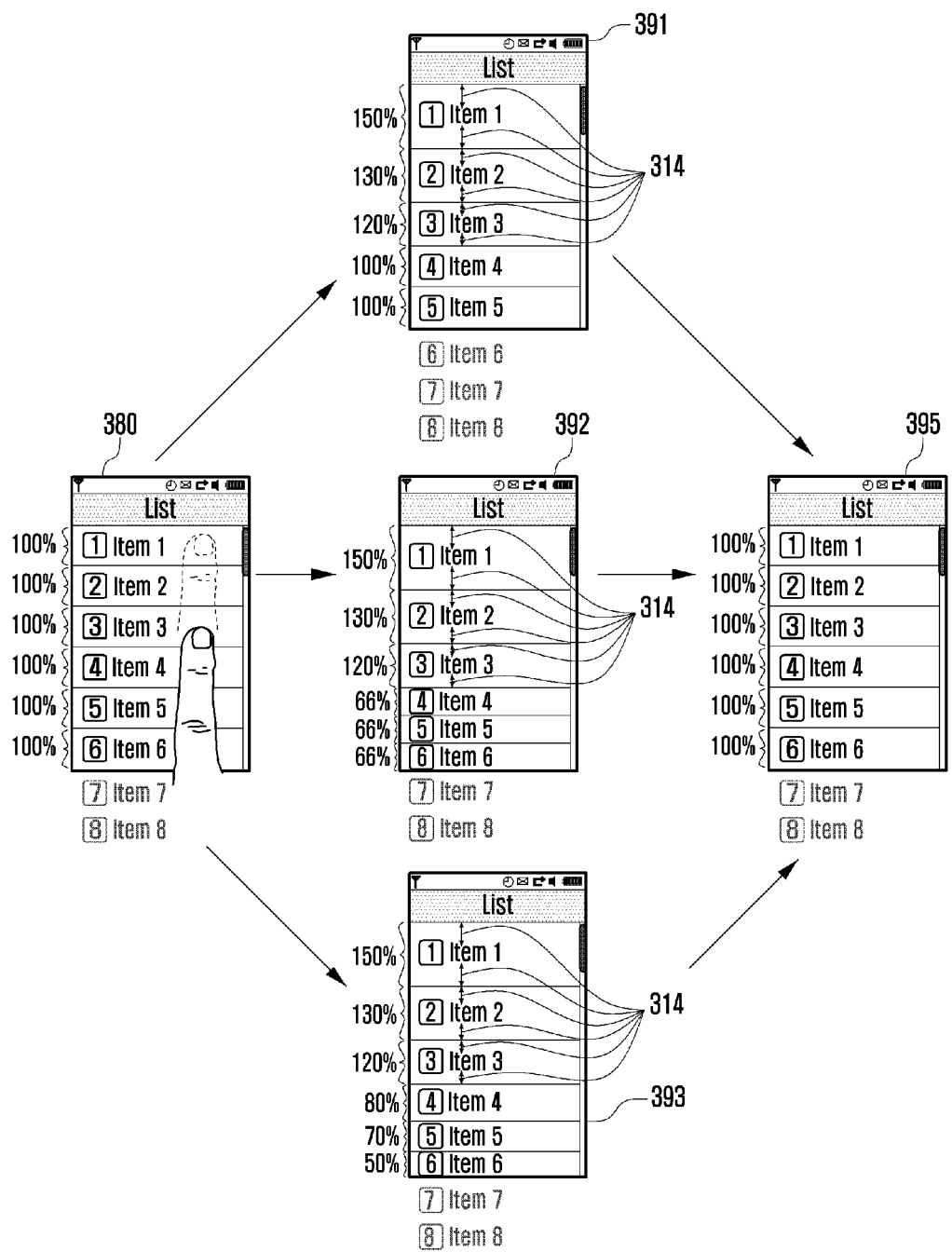

Referring now to FIGS. 3C and 3D, the display unit 131, as illustrated in screens 365 and 380 of respective FIGS. 3C and 3D, may output the first item ITEM 1 to the sixth item ITEM 6 as shown. When a scrolling-down signal is input, the display unit 131 may increase the sizes of the displaying regions of the first item to the third item irregularly. For example, as illustrated in screens 371 to 373 of FIG. 3C, and screens 391 to 393 of FIG. 3D, the display unit 131 may increase the displaying region of the first item by 150% of the original length, the displaying region of the second item by 130% of the original length, and the displaying region of the third item by 120% of the original length, irregularly. In this case, the display unit 131 may fix the names of the first item to the third item to the original positions as illustrated in the screens 371 to 373 of FIG. 3C, or may arrange the same at the center as illustrated in the screens 391 to 393 of FIG. 3D. Fifth arrows 313 of the screens 371 to 373 of FIG. 3C and sixth arrows 314 of the screens 391 to 393 of FIG. 3D are employed to denote the differences in positions of the displayed items in both FIGS. 3C and 3D but do not appear actually in the display unit 131 of the mobile terminal 100.

Similar to screens 371 and 391 of respective FIGS. 3C and 3D, the display unit 131 may scroll the displaying regions of the fourth item to the sixth item as long as the increased lengths while maintaining the longitudinal lengths of the displaying regions of the fourth item to the sixth item. That is, only the first item to the sixth item is output on the screen of the display unit 131 but the sixth item is not output on the screen of the display unit 131. Alternatively, the display unit 131 may reduce the longitudinal lengths of the fourth item to the sixth item regularly like the screens 372 and 392 of respective FIGS. 3C and 3D in response to the increased longitudinal lengths of the first item to the third item, or irregularly like the screens 373 and 393. Since the above description is similar to the description in association with FIGS. 3A and 3B, the description will be omitted.

Referring to FIGS. 3C and 3D, the display unit 131 may restore the increased or reduced longitudinal lengths of the displaying regions of the respective items to their original longitudinal lengths like the screens 375 and 395. As described above, when an image is modified by the first touch input, the display unit 131 may restore the modified image to the original image at the release of the touch. When the image is modified by the second touch input, the display unit 131 may restore the modified image after the lapse of a preset time.

Hereinbefore, the modification of the sizes of displaying regions of three items is described, but the present invention is not limited thereto. According to the present invention, the number of displaying regions of items, longitudinal lengths of which are modified may include at least one modification in order to provide visual feedback to the user that a scrolling boundary of the display screen has been reached. The ratios of increase and reduction of the displaying regions of the items described with reference to FIGS. 2A to 3D are just examples to illustrate the claimed invention to a person of ordinary skill in the art and the present invention is not limited thereto. That is, the increase and reduction ratios of the displaying regions of the items may be determined according to the amount of visual feedback that may be desired to be provided to a user.

Hereinafter, a scrolling method of a mobile terminal for providing visual feedback to a user of a boundary of a scrollable image using a change of a gap between items will now be described herein below.

Figure 4B:
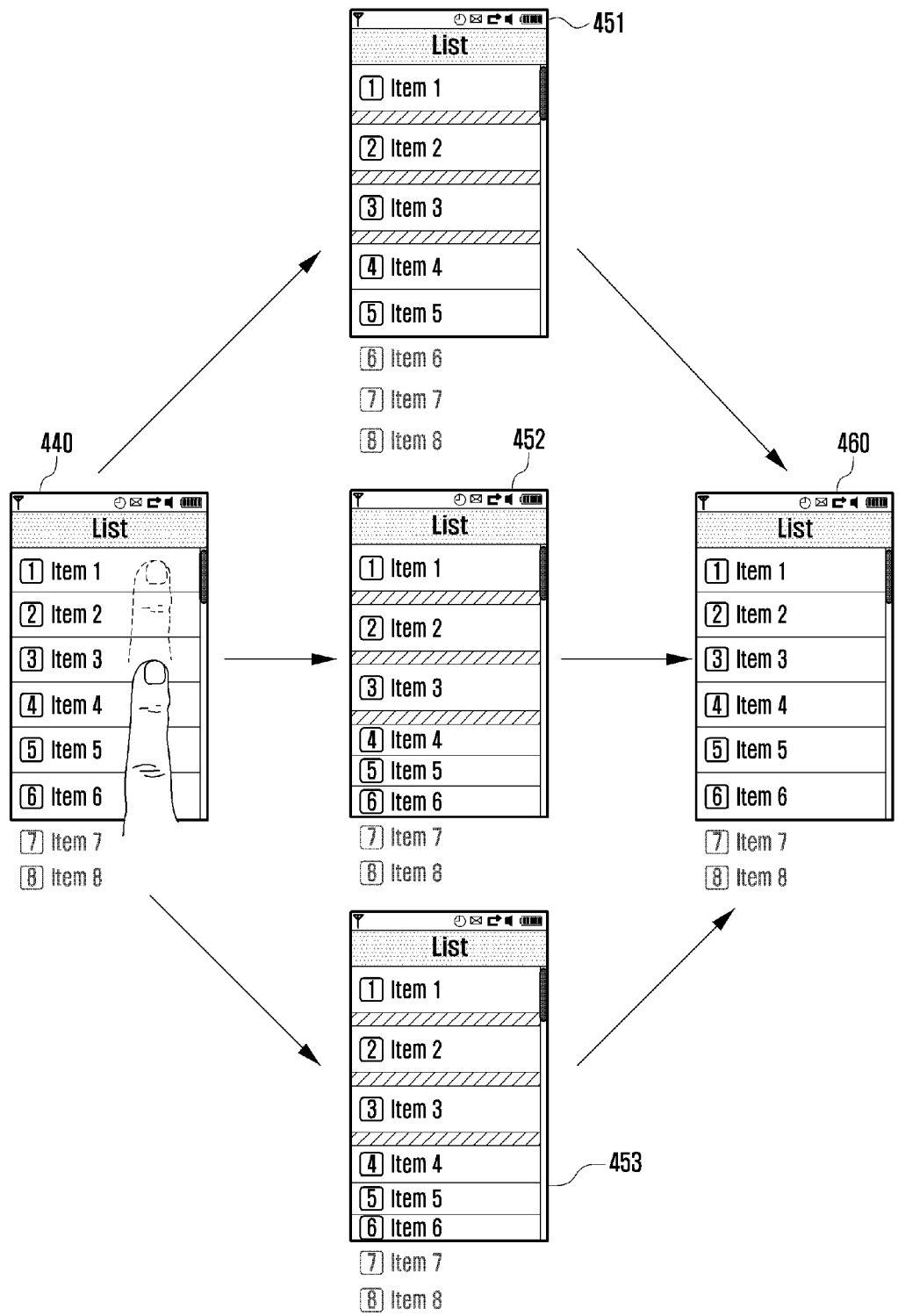

FIGS. 4A to 4C are views illustrating exemplary screens provided to describe a scrolling method according to still another exemplary embodiment of the present invention.

Referring now to FIGS. 4A to 4C, the display unit 131 may expand a gap between the first item and the second item when the first item is output such as shown in screen 410 of FIG. 4A and the scrolling-down signal is input. In this case, the control unit 110 may control the remaining items to be pushed back as long as is the size of the expanded gap, or for the expanded gap to be output in a specific color, and/or a background image to be output. For example, when the scrolling-down signal is input, the display unit 131 may expand the gap between the first item and the second item for a preset distance and may output the second item to the sixth item while fixing the first item like in screen 421 in FIG. 4A. At this time, the sixth item, which was output in the screen 410, is pushed back and does not appear on the display unit 131.

Alternatively, in order to maintain the preset number of items to be output in a screen, the display unit 131 may, for example, reduce sizes of the displaying regions of the second item to the sixth item. The display unit 131 may reduce the sizes of the displaying regions of the second item to the sixth item regularly like screen 422 in FIG. 4A or irregularly like screen 423 (FIG. 4A). Then, the display unit 131 may restore the expanded gap to the original length like screen 430. The display unit 131 may restore the size of the expanded gap to the size of the original gap at the release of the touch when the gap between the items is expanded by the first touch input, and after the lapse of a preset time when the gap between the items is expanded by the second touch input.

When the scrolling-down signal is generated in a state such as shown in screen 440 of FIG. 4B, the display unit 131 may expand gaps between, for example, four items, that is, gaps between the first item and the second item, between the second item and the third item, and between the third item and the fourth item as much as a preset size regularly so as to feedback visual indication to the user under the control of the control unit 110, as illustrated in FIG. 4B. The display unit 131 may output the fourth item and the fifth item in their original sizes and may not output the sixth item, such as shown in screen 451. Alternatively, the display unit 131 may reduce the sizes of the displaying regions of the fourth item to the sixth item regularly like screen 452, or irregularly like screen 453. Then, the display unit 131 may restore the increased or reduced gap between the items to the original gap like screen 460.

Such as shown in FIG. 4B, when the scrolling-down signal is generated at a beginning of a screen 440, the display unit 131, as illustrated in FIG. 4C, may expand a plurality of gaps such as gaps between the first item and the second item, between the second item and the third item, and between the third item and the fourth item irregularly under the control of the control unit 110. For example, the display unit 131 may expand the gap between the first item and the second item by a preset size, the gap between the second item and the third item to 50% of the gap between the first item and the second item, the gap between the third item and the fourth item to 30% of the gap between the first item and the second item. The display unit 131 may output the fourth item and the fifth item in their original sizes may not output the sixth item like screen 481. The display unit 131 may reduce the sizes of the displaying regions of the fourth item to the sixth item regularly like screen 482. The display unit 131 may reduce the sizes of the displaying regions of the fourth item to the sixth item irregularly like a screen 483. Then, the control unit 110 may restore the expanded or reduced gap between the items to the original gap as shown in screen 490 of FIG. 4C.

Although herein so far the method of scrolling an image down is described with reference to FIGS. 2A to 4C, the present invention is not limited thereto. That is, the present invention may be applied to a method of scrolling an image upward as well as downward, or to the left, right, diagonally, etc. For example, when a thirtieth item is output during the scrolling-up of thirty item images having thirty items or the scrolling-up signal is input in the state of outputting the thirtieth item, the control unit 110 may increase at least one of sizes of the displaying regions and the gaps between the items as many as a preset number from the lowest side of the display unit 131 and may restore the increased size to the original size. By doing so, visual indication that the last item is reached/output may be fed back to the user. In addition, the presently claimed invention is not limited to a visual indication, an audible indication, such as a sound, tone, and/or a tactile indication, such as vibration, or a combination of any or all of the above, may be used to make a user aware that there is no more ability to scroll down a list or an image, etc.

Hereinafter, a case where a plurality of items is output in the vertical direction and in the horizontal direction will now be described with reference to FIGS. 5A and 5B.

Figure 5A:
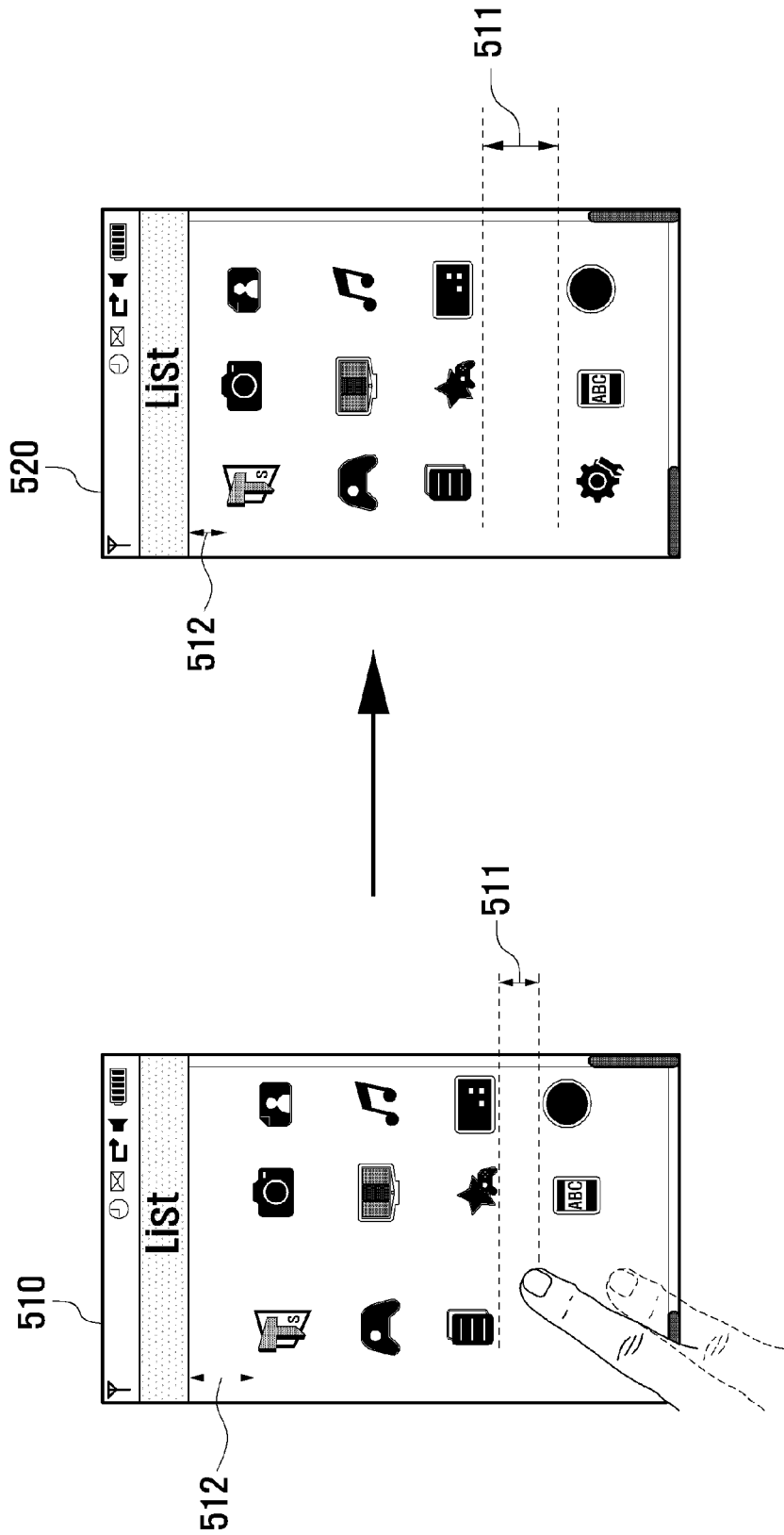
FIGS. 5A and 5B are views illustrating exemplary screens provided to describe a scrolling method of a mobile terminal according to an exemplary embodiment of the present invention performed when an icon image is output.
Figure 5B:
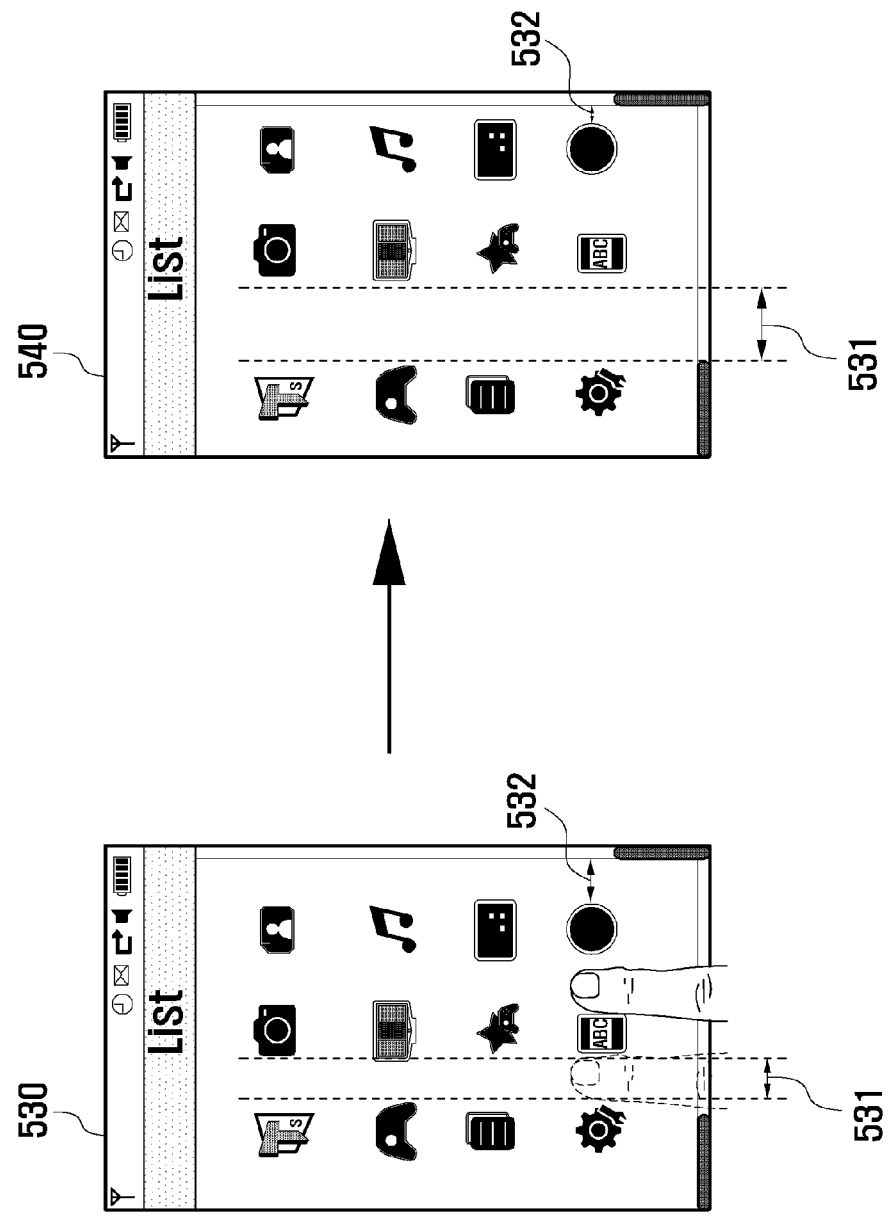

FIGS. 5A and 5B are views illustrating exemplary screens provided to teach how a scrolling method is performed when a plurality of items is output in the vertical direction and in the horizontal direction.

Referring now to FIGS. 1, 5A and 5B, the display unit 131 may output icon type images (hereinafter, referred to as "icon images") of a plurality of items which are arranged in the horizontal direction and in the vertical direction as shown in screen 510. The icon images may include icon images of menus and thumbnail images, for example, words, drawings, or of photograph items, just to name a few possibilities. The screen 510 indicates a state where a last row of the icon images is output/displayed at the lowest side of the display unit 131. When the scrolling-up signal is input, the display unit 131 may increase a gap 511 between the last row and a previous row by a preset size as shown in screen 520, and may return to a display as shown in screen 510 to provide an indication to the user. When the gap between the rows is expanded by the first touch input, the display unit 131 may restore the expanded gap to the original gap at the release of the touch. When the gap between the rows is expanded by the second touch input, the display unit 131 may restore the expanded gap to the original gap after the lapse of a preset/predetermined amount of time.

Comparing arrows 512 of the screens 510 and 520 with each other, it can be understood that the remaining rows except for the last (bottom) row and the next-to-last previous row are moved while maintaining an original gap between the rows as much as the increase of the gap 511 between the last row and the previous row. However, the present invention is not limited thereto. That is, as described above, the display unit 131 may reduce the gaps between the remaining rows without maintaining the gaps between the remaining rows or the sizes of the icons included in the remaining rows. The seventh arrows 512 are employed in this application to denote the difference between the screens 510 and 520 but do not appear in the actual display unit 131 of the mobile terminal 100.

When the user moves his/her finger (or a pointing device such as a stylus) rightward in a state as shown in screen 530 of FIG. 5B, that is, in a state where a first column is output on the left-most side of the display unit 131, the display unit 131 may expand a gap 531 between the first column and a second column by a preset size and may return to the screen 530 to feed back information to the user that the first column is the last column back and no more scrolling is permitted in that direction. When at least one of the gaps between the rows and the columns is expanded by the first touch input, the display unit 131 may restore the expanded gap between the rows and the columns to the original gap at the release of the touch. When the same at least one of the gaps between the rows and the columns is expanded by the second touch input, the display unit 131 may restore the expanded gap to the original gap after the lapse of a preset time. By comparing eighth arrows 532 of the respective screens 530 and 540 with each other, it can be understood that the remaining columns are moved as long as the increase of the gap 531 between the first column and the second column while maintaining gaps between the columns. However, the present invention is not limited thereto. That is, as described above, the display unit 131 may reduce the gaps between the remaining columns without maintaining the gaps between the remaining columns or the sizes of the icons included in the remaining columns. The eighth arrows 532 are employed to denote the difference between the screens 530 and 540 but do not actually appear in the display unit 131 of the mobile terminal 100.

Hereinabove, although the output of the last row or column is fed back by expanding at least one of the gaps between the rows and between the columns is described for the convenience of illustration, the present invention is not limited thereto. According to the present invention, an icon included in at least one of the last row or column may be expanded. Moreover, in order to feed back to a user the indication that it is impossible to scroll any further in a certain direction, the number of increased gaps between the rows or the columns may be two or more.

FIG. 6 is a view illustrating exemplary screens provided to describe the scrolling method of a mobile terminal performed when a webpage is output.

Referring now to FIG. 6, the display unit 131 may display a webpage including a plurality of templates. The webpage may have a resolution higher than that of the display unit 131. When the scrolling signal occurs in a direction where the scrolling cannot be performed (is not possible), the control unit 110 may expand some region (e.g. portion) of the webpage by a preset size and may restore the expanded webpage to the original state. The region/portion of the webpage may include at least one template, at least one gap between the templates, and a gap between the edges of the webpage and the templates. To this end, the control unit 110 may check the size (resolution) of the webpage when the webpage is output and the last template where text or an image is output on the webpage. The last template of the webpage may be a title template 612 where a name of the webpage is output, such as illustrated in FIG. 6. For example, when the scrolling-down signal is input in a state where the scrolling-down is impossible, such as shown in screen 610, the display unit 131 may expand the title template 612, that is, the last template of the webpage is displayed in a preset size such as shown in screen 620. When comparing ninth arrows 611 of the screens 610 and 620, can be understood by a person of ordinary skill in the art that the longitudinal length of the title template 612 is increased. When the region of the webpage such as shown in FIG. 6 is increased by the first touch input, the control unit 110 may restore the webpage having the increased region to its originally displayed state at the release of the touch. When some region of the webpage is increased by the second touch input, the control unit 110 may restore the webpage having the increased region to the original state after the lapse of a preset amount of time.

Although the method and the apparatus according to the exemplary embodiments of the present invention are applied to a touch screen, the present invention is not limited thereto. The method and the apparatus of the present invention may be applied to a mobile terminal including a touch panel recognizing a touch input and separated from the display unit, or even to a display device, for example that utilizes a pointing device or stylus.

As described herein above, the scrolling method and the scrolling apparatus of the present invention feeds back an indication to a user that the last region of an image is displayed so that an undesirable touch input by a user can be prevented.

The above-described methods according to the present invention can be realized in hardware or as software or computer code that can be stored in a machine readable recording medium such as a CD ROM, a RAM, thumbnail drive, a floppy disk, a flash storage, a hard disk, or a magneto-optical disk or downloaded over a network and stored as a non-transitory data on one of the aforementioned mediums, so that the methods described herein can be executed by such software using a general purpose computer, or a special processor or microprocessor, or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A scrolling method of a mobile terminal comprising:
    displaying a plurality of user-selectable items in a defined area of a display screen, wherein the plurality of user-selectable items are arranged in rows;
    receiving a touch input for scrolling the plurality of user-selectable items along the defined area of the display screen in a downward direction corresponding to a downward direction of a user's touch;
    expanding at least one gap between the rows while maintaining a top edge of a first row fixed to a top edge of the defined area of the display screen, in response to receiving the touch input for scrolling when the plurality of user-selectable items displayed on the defined area of the display screen cannot be scrolled further in the downward direction; and
    restoring the at least one gap between rows on the display screen to an original size in further response to an event;
    wherein expanding at least one gap comprises expanding an upper space between an item name of a user-selectable item and an upper edge of a displaying region of that item, and expanding at least one lower space between the item name and a lower edge of the displaying region of that item.

2. The scrolling method of a mobile terminal of claim 1, further comprising:
    expanding at least one additional gap between the plurality of user-selectable items.

3. The scrolling method of a mobile terminal of claim 2, wherein said expanding at least one additional gap comprises concurrently setting a plurality of additional gaps between the rows at different ratios relative to their original sizes.

4. The scrolling method of claim 1, wherein the user-selectable items are templates of a webpage.

5. The scrolling method of a mobile terminal of claim 1, wherein the modifying of the displaying region of the first item comprises modifying a size of the displaying region of the first item.

6. The scrolling method of a mobile terminal of claim 5, further comprising:
    modifying a size of a displaying region of a second item located adjacent to the first item concurrently with modifying of the size of the first item such that an amount of size change applied to the second item is less than an amount of size change applied to the first item.

7. The scrolling method of a mobile terminal of claim 1, further comprising:
    receiving a touch input for scrolling the plurality of user-selectable items along the defined area of the display screen in an upward direction corresponding to an upward direction of a user's touch;
    modifying a displaying region of a last item of the plurality of user-selectable items such that a bottom edge of the displaying region of the last item remains fixed to a bottom edge of the defined area of the display screen in response to receiving the touch input for scrolling when the plurality of user-selectable items displayed on the defined area of the display screen cannot be scrolled further in an upward direction corresponding to the upward direction of the user's touch; and
    restoring the modified displaying region of the last item on the display screen.

8. The scrolling method of a mobile terminal of claim 7, wherein the modifying of the displaying region of the last item comprises modifying a size of the displaying region of the last item.

9. The scrolling method of a mobile terminal of claim 8, further comprising:
    modifying a size of a displaying region of a third item located adjacent to the last item concurrently with modifying of the size of the last item such that an amount of size change applied to the third item is less than an amount of size change applied to the last item.

10. The scrolling method of a mobile terminal of claim 1, wherein each row contains a plurality of independently selectable items, and the method further comprising:

receiving a touch input for scrolling the plurality of user-selectable items along the defined area of the display screen in a leftward direction corresponding to a leftward direction of a user's touch;

expanding at least one gap between columns such that a right edge of a last column remains fixed to a right edge of the defined area of the display screen in response to receiving the touch input for scrolling when the plurality of user-selectable items displayed on the defined area of the display screen cannot be scrolled further in the leftward direction; and restoring the at least one gap between columns on the display screen to an original size in further response to an event.

11. The scrolling method of a mobile terminal of claim 10, further comprising:

increasing sizes of the user-selectable items included in the expanded at least one row and the expanded at least one column.

12. A scrolling method of a mobile terminal comprising:

displaying a plurality of user-selectable items in a defined area of a display screen, wherein the plurality of user-selectable items are arranged in rows;

receiving a touch input for scrolling the plurality of user-selectable items along the defined area of the display screen in a downward direction corresponding to a downward direction of a user's touch;

expanding at least one gap between the rows while maintaining a top edge of a first row fixed to a top edge of the defined area of the display screen, in response to receiving the touch input for scrolling when the plurality of user-selectable items displayed on the defined area of the display screen cannot be scrolled further in the downward direction;

reducing a size of displaying regions of remaining items except for at least one item with a displaying region encompassing the expanded gap, so as to maintain a display of the same number of items as displayed preceded the touch input; and restoring the at least one gap between rows on the display screen to an original size in further response to an event.

13. The scrolling method of claim 12, wherein the user-selectable items are templates of a webpage.

14. A scrolling apparatus of a mobile terminal comprising:

a display unit for displaying a plurality of user-selectable items in a defined area of a display screen, wherein the plurality of user-selectable items are arranged in rows;

a touch panel for receiving a touch input for scrolling the plurality of user-selectable items along the defined area of the display screen in a downward direction corresponding to a downward direction of a user's touch; and a control unit for expanding at least one gap between rows while maintaining a top edge of a first row fixed to a top edge of the defined area of the display screen, in response to receiving the touch input for scrolling when the plurality of user-selectable items displayed on the defined area of the display screen cannot be scrolled further in the downward direction, and restoring the at least one gap between rows on the display screen to an original size in further response to an event;

wherein the control unit reduces a size of displaying regions of remaining items except for at least one item with a displaying region encompassing the expanded gap, so as to maintain a display of the same number of items as displayed preceded the touch input.

15. The scrolling apparatus of a mobile terminal of claim 14, wherein the user-selectable items are templates of a webpage.

16. A scrolling apparatus of a mobile terminal comprising:

a display unit for displaying a plurality of user-selectable items in a defined area of a display screen, wherein the plurality of user-selectable items are arranged in rows;

a touch panel for receiving a touch input for scrolling the plurality of user-selectable items along the defined area of the display screen in a downward direction corresponding to a downward direction of a user's touch; and a control unit for expanding at least one gap between rows while maintaining a top edge of a first row fixed to a top edge of the defined area of the display screen, in response to receiving the touch input for scrolling when the plurality of user-selectable items displayed on the defined area of the display screen cannot be scrolled further in the downward direction, and restoring the at least one gap between rows on the display screen to an original size in further response to an event;

wherein the control unit expands the at least one gap by expanding an upper space between an item name of a user-selectable item and an upper edge of a displaying region of that item, and expanding at least one lower space between the item name and a lower edge of the displaying region of that item.

17. The scrolling apparatus of a mobile terminal of claim 16, wherein the control unit expands at least one additional gap between the plurality of user-selectable items, whereby a plurality of gaps are expanded.

18. The scrolling apparatus of a mobile terminal of claim 17, wherein, the control unit expands the at least one additional gap concurrently setting a plurality of additional gaps at different ratios relative to their original sizes.

19. The scrolling apparatus of claim 16, wherein the user-selectable items are templates of a webpage.

20. The scrolling apparatus of a mobile terminal of claim 16, wherein the control unit modifies a size of the displaying region of the first item.

21. The scrolling apparatus of a mobile terminal of claim 20, wherein the control unit modifies a size of a displaying region of a second item located adjacent to the first item concurrently with modifying of the size of the first item such that an amount of size change applied to the second item is less than an amount of size change applied to the first item.

22. The scrolling apparatus of a mobile terminal of claim 16, wherein the control unit receives a touch input for scrolling the plurality of user-selectable items along the defined area of the display screen in an upward direction corresponding to an upward direction of a user's touch, modifies a displaying region of a last item of the plurality of user-selectable items such that a bottom edge of the displaying region of the last item remains fixed to a bottom edge of the defined area of the display screen in response to receiving the touch input for scrolling when the plurality of user-selectable items displayed on the defined area of the display screen cannot be scrolled further in the upward direction corresponding to the upward direction of the user's touch, and restoring the modified-displaying region of the last item on the display screen to an original size.

23. The scrolling apparatus of a mobile terminal of claim 16, wherein each row contains a plurality of independently selectable items, and the control unit receives a touch input for scrolling the plurality of user-selectable items along the defined area of the display screen in a leftward direction corresponding to the leftward direction of a user's touch, expands at least one gap between columns such that a right edge of a last column remains fixed to a right edge of the defined area of the display screen in response to receiving the touch input for scrolling when the plurality of user-selectable items displayed on the defined area of the display screen cannot be scrolled further in the leftward direction, and restoring the at least one gap between columns on the display screen to an original size.

24. The scrolling apparatus of a mobile terminal of claim 23, wherein the control unit increases sizes of the user-selectable items included in the expanded at least one row and expanded at least one column.

* * * * *

UNITED STATES PATENT AND TRADEMARK OFFICE
CERTIFICATE OF CORRECTION

Page 1 of 1

PATENT NO. : 8,881,050 B2
APPLICATION NO. : 12/834983
DATED : November 4, 2014
INVENTOR(S) : Mee Young Kim et al.

It is certified that error appears in the above-identified patent and that said Letters Patent is hereby corrected as shown below:

In the Claims

Column 16, Claim 22, Lines 60-61 should read as follows:
--...restoring the displaying region...--

Signed and Sealed this
Seventeenth Day of February, 2015

Michelle K. Lee
*Deputy Director of the United States Patent and Trademark Office*